March 12, 1935.  K. HEEGNER  1,993,783
OSCILLATION GENERATOR
Filed Dec. 28, 1932

"L" OR "R" OR PARALLEL TUNABLE CIRCUIT

INVENTOR-
KURT HEEGNER
BY
ATTORNEY-

Patented Mar. 12, 1935

1,993,783

UNITED STATES PATENT OFFICE 1,993,783

OSCILLATION GENERATOR

Kurt Heegner, Berlin, Germany, assignor to Telefunken Gesellschaft für Drahtlose Telegraphie m. b. H., Berlin, Germany, a corporation of Germany Application December 28, 1932, Serial No. 649,196
In Germany December 29, 1931

2 Claims. (Cl. 250—36)

This invention relates to wave generation by means of thermionic-tube systems.

Wave generation by the aid of electron tube systems which comprise only resistances and capacities and which are called multi-vibrators are known in the prior art. The basic idea of this invention consists in that one of the capacitive circuit elements is replaced by a piezo-electric crystal. What then results is a frequency for which the crystal presents a minimum electrical resistance. In this manner natural frequencies of the crystal are excited which the crystal possesses in the presence of short-circuited electrodes so that electrode and supply-lead capacities will no longer affect the frequency. Simple forms of construction in which the basic idea is incorporated are illustrated in Figs. 1 and 2.

Figure 3:
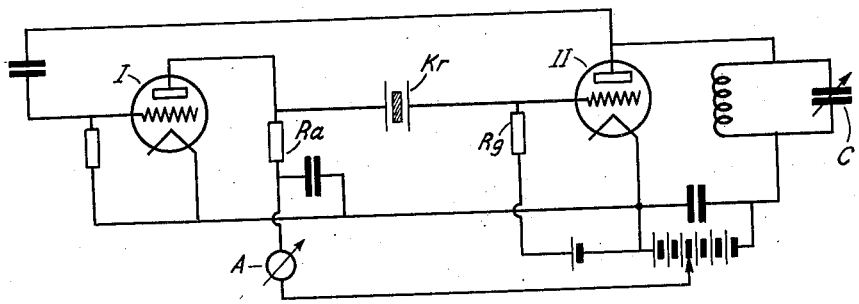
Figure 4:
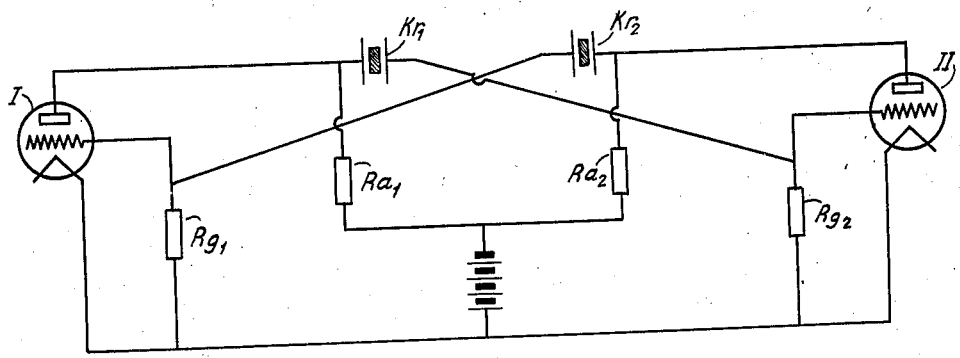

Figures 3 and 4 illustrate other embodiments employing the principles of my present invention.

Figure 1:
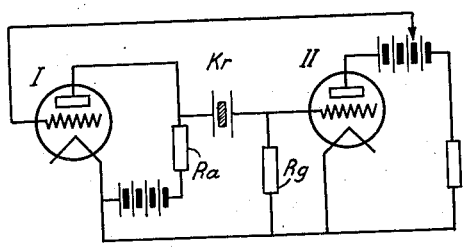
Figure 2:
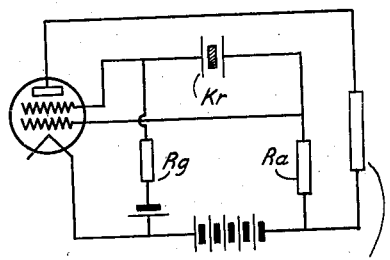

Fig. 1 illustrates the use of a two-tube arrangement. The non-grounded battery in the plate circuit of the second tube can be dispensed with by the customary capacitive potential transfer. Fig. 2 comprises the use of a twin-grid tube arrangement. At first sight it might appear as if the operation of the scheme were predicated upon the oscillation of the multi-vibrator being stabilized by the crystal. However, the fact is that by the insertion of the crystal a new chance of initiating oscillations is created. By virtue of the electrode capacity of the crystal also multi-vibrator oscillations may arise. However, these are suppressible by choosing proper dimensions for the resistances $R_a$ and $R_g$. Indeed, the crystal oscillation will be surrounded by preferential conditions if the inequality:

$$R_k : R_a < C_a : C_k$$

is fulfilled, where $R_k$ is the minimum ohm resistance of the crystal, $C_k$ the inter-electrode capacity of the crystal, while $C_a$ stands for the sum total of the tube capacities and the lead capacities to which the resistance $R_a$ is disposed in parallel.

High frequency constancy or stability will be attained only if the values of the resistances $R_a$ and $R_g$ are of the order of magnitude of the crystal resistance $R_k$. For it will be only under this condition that the circuit consisting of the crystal and the resistances $R_a$ and $R_g$ will be subject to damping of the order of magnitude of the crystal damping. Dimensions suitable in this direction, however, are possible only for long waves. Application of the idea underlying the invention is feasible for short waves if in the two-tube arrangement Fig. 1 the resistance of the second tube is replaced by an electric oscillation circuit (Fig. 3). The second tube may then be one of the high-gain type, more particularly a screen-grid tube. The introduction of an oscillation circuit even offers a number of advantages in that, according to the adjustment of the natural period of the circuit the natural frequencies generable by self-excitation in the crystal are separately representable. Each of these frequencies is defined by the minimum plate current of the first tube. Inside the oscillation range the frequency of the oscillator is alterable linearly with the natural period of the electric oscillation circuit in accordance with this law:

$$d\omega : \Delta\omega = \theta k : \theta$$

where $d\omega$ the frequency change, $\theta k$ the damping of the circuit (crystal, $R_a$, $R_g$) and $\Delta\omega$ the change in the natural period of the electric oscillation circuit, and $\theta$ the damping thereof.

In the arrangement as so far described several natural frequencies of the crystal may be excited. This condition can be obviated by substituting piezo-electric crystals in place of two capacitive circuit elements as found, for instance, in the well-known Abraham and Bloch arrangement. These piezo-electric crystals should have but one natural frequency common to themselves, a condition obtainable by differentiating between their respective geometric forms or sections.

This embodiment of my invention is shown by way of example in the attached Figure 4 utilizing the two-tube arrangement suggested by Abraham and Bloch, in which $Kr1$ and $Kr2$ the two dissimilar crystals. Such a crystal system moreover offers the merit that the temperature coefficient relative to the frequency thereof may be varied provided that resonators $Kr1$ and $Kr2$ having different temperature coefficients are employed. The value of the temperature coefficient of the assembly may then be altered inside the values of the temperature coefficients of $Kr1$ and $Kr2$ by the choice of the damping of the crystal circuits $Rg1$, $Kr2$, $Ra2$, and $Ra1$, $Kr1$, $Rg2$. Such a system will be operable only inside a definite temperature range in which the two resonators are roughly in resonance. More particularly speaking, inside this range, a temperature coefficient of zero value is obtainable, if two resonators Kr1 and Kr2 having temperature coefficients of contrary sign are used. Thus, one of the crystals may be an X-section and the other one a Y-section, while the dampings of the two crystal circuits are chosen proportional to the absolute values of the temperature coefficients. Also in Figure 4 any one or more of the resistors may be replaced by a parallel tuned circuit such as shown in Figure 3.

To go a little more fully into the operation of my piezo-crystal multivibrator systems, specific reference is again made to Figure 3;

The operation of this circuit scheme will be readily understood if we assume the crystal Kr in Figure 3 to be replaced by a blocking condenser whose impedance is low compared with the grid resistance Rg. Then the resistances Ra and Rg establish a coupling such as used in resistance amplifiers between the tubes. The phase reversal insured by this coupling has this result that grid and plate alternating potential of tube II oscillate in phase opposition so that the oscillation circuit included in the plate circuit of this tube is capable of being caused to oscillate by self-excitation.

If, then, as shown in Figure 3 a crystal is disposed in lieu of the condenser whose electrode capacity possesses a very high impedance compared with the grid resistance Rg, oscillations will be feasible only when the oscillation circuit is tuned to a natural period of the crystal. For it is only in oscillating condition that the crystal assumes such a low resistance that sufficient voltage will be transferred to the grid of tube II. In the presence of a minimum crystal resistance will the coupling be of maximum value, and this condition will be indicated by the minimum deflection of the ammeter contained in the plate circuit of tube I. The frequency thus defined lies very closely to the natural period of the crystal assumed by the latter with the electrodes short-circuited. The behavior of the crystal in this circuit arrangement is entirely decisive in that the detuning of the oscillation circuit occasions only a very slight change in frequency about the defined natural frequency of the crystal. A formula for this dependence has already been indicated hereinabove.

The operation of my invention according to Fig. 1 is explained as follows: The very slight change in frequency which occurs upon a detuning of the electric circuit exercises no serious effect upon the value of the impedance of the electric circuit. Upon substituting an ohmic resistance for the electric circuit, there still exists ample opportunity for the crystal to be excited at one of its natural periods. If the crystal possesses several natural frequencies, it will most likely vibrate at that frequency at which it offers the lowest ohmic resistance. The circuit scheme of Fig. 1 will produce oscillations even when the crystal is replaced by a condenser. These oscillations in the course of a period exhibit two sudden changes in the current, and are accompanied by an abundance of higher harmonics. The device is, therefore, aptly called a "multivibrator".

The described crystal vibrations may be explained by the aid of an equivalent electrical circuit. To do so, a coil is connected in series with the condenser. If the electrical dimensions of the coil and condenser have been chosen suitably, the abrupt changes in the current may be suppressed by the adoption of ways and means as stated. The ensuing frequency is then governed by the natural frequency of the series circuit comprising inductance and capacity. Accordingly the arrangement at the terminal points of the series circuit or at the connecting points where the crystal of Figure 1 is joined into circuit, exhibits a drooping current-voltage characteristic of the nature of an arc or of a glow-discharge. The series circuit including resistances Ra and Rg, with the use of electric circuit elements, will be, generally speaking, subject to marked damping, but by the use of piezo-electric crystals it will be appreciably easier to adapt these resistances to the low resistance of the crystal.

Also, and by way of explanation, the circuit scheme of Fig. 2 which comprises a space-charge grid, suggests another type of multivibrator circuit arrangement if a condenser is substituted for the piezo-electric crystal. The circuit arrangement of Fig. 2, however, is derivable also from Fig. 1, if it is noted that tube II, Fig. 1, serves essentially only as a phase reverser. In both circuit schemes, the alternating voltages across resistances Ra and Rg in the circuit (Ra Kr Rg) are of opposite sense. In Figure 2 this happens because, upon a rise of the control grid voltage, the current flowing in the space-charge grid drops.

Having thus described my invention, what I claim is:

1. In combination, a tube having filament, grid and plate electrodes, a circuit connected between the grid and filament, an electron discharge device having an anode, cathode and control electrode, a circuit connected between the control electrode and cathode, a tuned circuit connected between said anode and cathode, a condenser connected between the anode of said device and the grid of said tube for establishing feed back, and, a piezo-electric crystal connected between the plate of said tube and the control electrode of said device, the impedance of said circuits other than said tuned circuits being so chosen in value that said crystal faces into impedances of the order of magnitude of the series resistance of said crystal at resonance.

2. Apparatus as claimed in the preceding claim characterized by the fact that said device is in the form of a tube having a high amplification factor.

KURT HEEGNER.